(12) United States Patent
Huang et al.

(10) Patent No.: US 9,785,551 B2
(45) Date of Patent: Oct. 10, 2017

(54) MEMORY ACCESS METHOD, BUFFER SCHEDULER AND MEMORY MODULE

(71) Applicant: Huawei Technologies Co., Ltd., Shenzhen (CN)

(72) Inventors: Yongbing Huang, Beijing (CN); Mingyu Chen, Beijing (CN); Licheng Chen, Beijing (CN); Zehan Cui, Beijng (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 12 days.

(21) Appl. No.: 14/953,320

(22) Filed: Nov. 28, 2015

(65) Prior Publication Data
US 2016/0085670 A1    Mar. 24, 2016

Related U.S. Application Data

(63) Continuation of application No. PCT/CN2013/088252, filed on Nov. 30, 2013.

(30) Foreign Application Priority Data

May 30, 2013  (CN) .......................... 2013 1 0209787

(51) Int. Cl.
  *G06F 12/02* (2006.01)
  *G06F 13/16* (2006.01)
(52) U.S. Cl.
  CPC ...... *G06F 12/0284* (2013.01); *G06F 13/1605* (2013.01); *G06F 13/1673* (2013.01);
  (Continued)

(58) Field of Classification Search
  CPC ............. G06F 12/0284; G06F 13/1605; G06F 13/1673; G06F 2212/2532; G06F 2212/1044
  See application file for complete search history.

(56) References Cited

U.S. PATENT DOCUMENTS 7,251,710 B1 *  7/2007  Isaac ................... G06F 12/0862
                                                             711/100
7,308,523 B1    12/2007  Ngai
                (Continued)

FOREIGN PATENT DOCUMENTS

CN    101042678 A    9/2007
CN    101526925 A    9/2009
CN    102567415 A    7/2012

*Primary Examiner* — Aracelis Ruiz
(74) *Attorney, Agent, or Firm* — Slater Matsil, LLP

(57) ABSTRACT

The present invention discloses a memory access method, a buffer scheduler, and a memory module, which can support multiple application scenarios without changing the memory module or a memory chip. The method includes: receiving an operation request message for memory access data, where the operation request message includes tag information of the memory access data, operation information of the memory access data, and a memory address of the memory access data; and performing, according to at least one of the tag information of the memory access data, a memory address of the memory access data, and the operation information of the memory access data, an operation on the tag of the memory access data and/or the memory access data stored in the memory module. The present invention is applicable to the computer field.

12 Claims, 4 Drawing Sheets

(52) U.S. Cl.
CPC .............. *G06F 2212/1044* (2013.01); *G06F 2212/2532* (2013.01)

(56) References Cited

U.S. PATENT DOCUMENTS

| | | | |
|---|---|---|---|
| 7,580,914 B2 * | 8/2009 | Wang | G06F 9/3004 712/216 |
| 2001/0042180 A1 | 11/2001 | Laberge | |
| 2007/0226426 A1 | 9/2007 | Clark et al. | |
| 2011/0296106 A1 | 12/2011 | Yen et al. | |

* cited by examiner

– continued –

MEMORY ACCESS METHOD, BUFFER SCHEDULER AND MEMORY MODULE

This application is a continuation of International Application No. PCT/CN2013/088252, filed on Nov. 30, 2013, which claims priority to Chinese Patent Application No. 201310209787.8, filed on May 30, 2013, both of which are hereby incorporated by reference in their entireties.

TECHNICAL FIELD

The present invention relates to the computer field, and in particular, to a memory access method, a buffer scheduler, and a memory module.

BACKGROUND

As a shared resource of a computer system, a memory system can be simultaneously accessed by multiple application programs. In order for the multiple application programs to implement particular functions in different scenarios, access to memory data needs to be subject to different limitations. For example, to implement a scenario in which device A can only access data stored in device A, an access control function needs to be implemented so that the memory data stored in device A can be distinguished and is restricted in access except for device A.

To enable the access to the memory data to be subject to different limitations, usually different attributes are allocated to the memory data in the memory system. The memory data can be processed only when an attribute carried in a memory access request message matches an attribute of the memory data in the memory system.

In the prior art, a method for implementing a tagged memory is to implement allocation of a memory data attribute at the hardware level. A main idea of the method is: allocating additional memory space to memory data, using the allocated memory space as a tag bit of the memory data, and storing an attribute corresponding to the memory data in the tag bit. In this method, to add an additional and fixed tag to each piece of memory data in the memory system, design of a memory module or a memory chip needs to be modified. However, an existing memory module or memory chip adopts fixed specifications and standards, and costs for modification are relatively high. In addition, in the design process of the memory module or the memory chip, a length of an added tag is usually fixed to ensure that units of storage for storage units are consistent. However, a scenario that can be implemented by using a tag of fixed bits is also limited, which is subject to a specific limitation.

Therefore, it is necessary to design a method in which a tagged memory having multiple functions in multiple application scenarios is supported, without a need of modifying the memory module or the memory chip.

SUMMARY

Embodiments of the present invention provide a memory access method, a buffer scheduler, and a memory module, which can support multiple application scenarios without changing a memory module or a memory chip.

To achieve the foregoing objective, the following technical solutions are adopted in the embodiments of the present invention:

According to a first aspect, a memory access method is provided, where the method includes:

receiving an operation request message for memory access data, where the operation request message includes tag information of the memory access data, operation information of the memory access data, and memory address information of the memory access data, where the tag information of the memory access data includes a tag type, and the tag type is used to instruct the buffer scheduler to perform an operation on the memory access data and/or a tag of the memory access data; and performing, according to at least one of the tag information of the memory access data, a memory address of the memory access data, and the operation information of the memory access data, an operation on the tag of the memory access data and/or the memory access data that are stored in a memory module.

According to the first aspect, in a first possible implementation manner of the first aspect, the performing, according to at least one of the tag information of the memory access data, a memory address of the memory access data, and the operation information of the memory access data, an operation on the tag of the memory access data that is stored in a memory module and/or the memory access data specifically includes:

determining, according to the tag type, whether to perform an operation on the tag of the memory access data;

if an operation is performed on the tag of the memory access data, using the memory address of the memory access data as an index and querying a pre-stored memory access tag location mapping table to determine a memory address of the tag of the memory access data, and performing, according to at least one of the tag information of the memory access data, the memory address of the tag of the memory access data, the memory address of the memory access data, and the operation information of the memory access data, an operation on the tag of the memory access data that is stored in the memory module, or the tag of the memory access data and the memory access data; and if no operation is performed on the tag of the memory access data, performing, at least according to the memory address of the memory access data and the operation information of the memory access data, an operation on the memory access data that is stored in the memory module.

According to the first possible implementation manner, in a second possible implementation manner of the first aspect, the tag information of the memory access data specifically includes the tag type and tag content; and the using the memory address of the memory access data as an index and querying a pre-stored memory access tag location mapping table to determine a memory address of the tag of the memory access data specifically includes:

determining whether a mapping relationship between the memory address of the memory access data and the memory address of the tag of the memory access data is stored in the pre-stored memory access tag location mapping table;

if the mapping relationship between the memory address of the memory access data and the memory address of the tag of the memory access data is stored, acquiring the memory address of the tag of the memory access data from the pre-stored memory access tag location mapping table according to the memory address of the memory access data; and if the mapping relationship is not stored, determining the tag content in the tag information of the memory access data as the tag of the memory access data, selecting, from the memory module, space that is greater than or equal to a tag granularity of the tag as the memory address of the tag of the memory access data, writing the tag into the memory address, and storing the mapping relationship between the memory address of the memory access data and the memory address of the tag of the memory access data into the pre-stored memory access tag location mapping table.

According to a second aspect, a memory access method is provided, where the method includes:

when a central processing unit sends an operation request message for memory access data to a buffer scheduler, receiving a first message and/or a second message sent by the buffer scheduler, where the first message carries a memory address of a tag of the memory access data and operation information about an operation on the tag of the memory access data, and the second message carries a memory address of the memory access data and operation information about an operation on the memory access data; and performing an operation on the tag of the memory access data and/or the memory access data according to the first message and/or the second message.

According to the second aspect, in a first possible implementation manner of the second aspect, the memory address of the tag of the memory access data and the memory address of the memory access data are different physical addresses in a memory module.

With reference to the second aspect or the first possible implementation manner, in a second possible implementation manner of the second aspect, the performing an operation on the tag of the memory access data according to the first message specifically includes:

acquiring the tag of the memory access data according to the memory address of the tag of the memory access data carried in the first message; and performing an operation on the acquired tag of the memory access data according to the operation information about an operation on the tag of the memory access data carried in the first message; and the performing an operation on the memory access data according to the second message specifically includes:

acquiring the memory access data according to the memory address of the memory access data carried in the second message; and performing an operation on the acquired memory access data according to the operation information about an operation on the memory access data carried in the second message.

According to a third aspect, a buffer scheduler is provided, where the buffer scheduler includes a receiving unit and an operating unit, where the receiving unit is configured to receive an operation request message for memory access data, where the operation request message includes tag information of the memory access data, operation information of the memory access data, and memory address information of the memory access data, where the tag information of the memory access data includes a tag type, and the tag type is used to instruct to perform an operation on the memory access data and/or a tag of the memory access data; and the operating unit is configured to perform, according to at least one of the tag information of the memory access data, a memory address of the memory access data, and the operation information of the memory access data, an operation on the tag of the memory access data and/or the memory access data that are stored in a memory module.

According to the third aspect, in a first possible implementation manner of the third aspect, the operating unit is specifically configured to:

determine, according to the tag type, whether to perform an operation on the tag of the memory access data;

if an operation is performed on the tag of the memory access data, use the memory address of the memory access data as an index and query a pre-stored memory access tag location mapping table to determine a memory address of the tag of the memory access data, and perform, according to at least one of the tag information of the memory access data, the memory address of the tag of the memory access data, the memory address of the memory access data, and the operation information of the memory access data, an operation on the tag of the memory access data that is stored in the memory module, or the tag of the memory access data and the memory access data; and if no operation is performed on the tag of the memory access data, perform, according to the memory address of the memory access data and the operation information of the memory access data, an operation on the memory access data that is stored in the memory module.

According to the first possible implementation manner, in a second possible implementation manner of the third aspect, the tag information of the memory access data specifically includes the tag type and tag content; and the operating unit is specifically configured to:

determine whether a mapping relationship between the memory address of the memory access data and the memory address of the tag of the memory access data is stored in the pre-stored memory access tag location mapping table;

if the mapping relationship between the memory address of the memory access data and the memory address of the tag of the memory access data is stored, acquire the memory address of the tag of the memory access data from the pre-stored memory access tag location mapping table according to the memory address of the memory access data; and if the mapping relationship is not stored, determine the tag content in the tag information of the memory access data as the tag of the memory access data, select, from the memory module, space that is greater than or equal to a tag granularity of the tag as the memory address of the tag of the memory access data, write the tag into the memory address, and store the mapping relationship between the memory address of the memory access data and the memory address of the tag of the memory access data into the pre-stored memory access tag location mapping table.

According to a fourth aspect, a memory module is provided, where the memory module includes a receiving unit and an operating unit, where the receiving unit is configured to: when a central processing unit sends an operation request message for memory access data to a buffer scheduler, receive a first message and/or a second message sent by the buffer scheduler, where the first message carries a memory address of a tag of the memory access data and operation information about an operation on the tag of the memory access data; and the second message carries a memory address of the memory access data and operation information about an operation on the memory access data; and the operating unit is configured to perform an operation on the tag of the memory access data and/or the memory access data according to the first message and/or the second message.

According to the fourth aspect, in a first possible implementation manner of the fourth aspect, the memory address of the tag of the memory access data and the memory address of the memory access data are different physical addresses in the memory module.

With reference to the fourth aspect or the first possible implementation manner, in a second possible implementation manner of the fourth aspect, the operating unit is specifically configured to:

acquire the tag of the memory access data according to the memory address of the tag of the memory access data carried in the first message; and perform an operation on the acquired tag of the memory access data according to the operation information about an operation on the tag of the memory access data carried in the first message; and the operating unit is further specifically configured to:

acquire the memory access data according to the memory address of the memory access data carried in the second message; and perform an operation on the acquired memory access data according to the operation information about an operation on the memory access data carried in the second message.

The embodiments of the present invention provide a memory access method, a buffer scheduler, and a memory module. A memory access tag location mapping table that includes a mapping relationship between an address of memory access data and an address of a tag of the memory access data is pre-stored in the buffer scheduler, so that the memory access data and the tag of the memory access data can be stored at any different positions in the memory module, and meanwhile, the tag of the memory access data with various granularities can be stored in the memory module; when a central processing unit requests, according to an application scenario, to perform an operation on the memory access data and/or the tag of the memory access data stored in the memory module, an operation request message includes tag information of the memory access data, operation information of the memory access data, and memory address information of the memory access data, where the tag information includes a tag type that indicates the application scenario, so that the buffer scheduler can determine an operation that needs to be performed on the memory access data and/or the tag of the memory access data, so as to further support multiple scenarios without changing the memory module or a memory chip.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention shall fall within the protection scope of the present invention.

Embodiment 1

Figure 1:
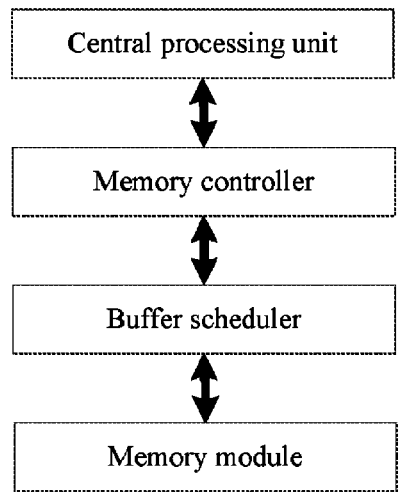
FIG. 1 is a schematic scenario diagram of a memory access method according to an embodiment of the present invention.

As shown in FIG. 1, this embodiment of the present invention provides an application scenario diagram of a memory access method. The scenario includes a central processing unit, a memory controller, a buffer scheduler, and a memory module. The memory controller receives an operation request message sent by the central processing unit, and the memory controller processes the operation request message into an operation request message with a fixed format, and sends a processed operation request message to the buffer scheduler by using a synchronous memory bus protocol or an asynchronous interface. The processed operation request message includes tag information of memory access data, operation information of the memory access data and a memory address of the memory access data. After receiving the processed operation request message, the buffer scheduler processes, according to the tag information of the memory access data, the operation information of the memory access data, and the memory address of the memory access data that are carried in the operation request message, the memory access data and a tag corresponding to the memory access data that are stored in the memory module, so as to implement access to memory data without changing the memory module or a memory chip.

Figure 2:
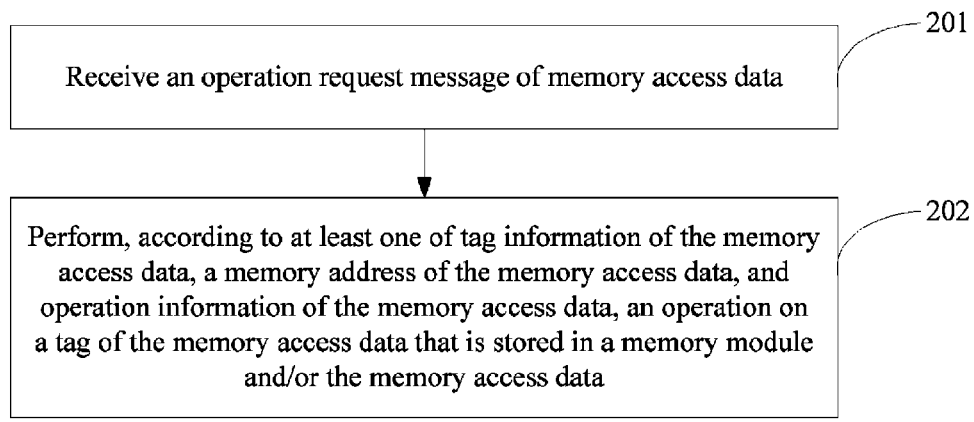
FIG. 2 is a schematic flowchart of a memory access method according to an embodiment of the present invention.

This embodiment of the present invention provides a memory access method. As shown in FIG. 2, the method includes:

201. Receive an operation request message for memory access data.

The operation request message includes tag information of the memory access data, operation information of the memory access data, and memory address information of the memory access data.

Specifically, the buffer scheduler may receive the operation request message for the memory access data that is sent by the memory controller by using a synchronous memory bus protocol or an asynchronous interface.

The tag information of the memory access data includes a tag type, and the tag type is used to instruct the buffer scheduler to perform an operation on the memory access data and/or a tag of the memory access data.

Specifically, the tag information may include only the tag type, for example, the tag type may be synchronization, access control, a directory, a memory overflow, or the like.

Certainly, the tag information may further include tag content, or tag content and a tag feature both. The tag content serves different purposes for different application scenarios. For example, when the tag type is access control, the tag content may be used to indicate a process ID for accessing data of the memory address of the memory access data; when the tag type is adding N to data of a memory, the tag content may be N, and is used to instruct to add N to the data of the memory address of the memory access data. The tag feature is used to indicate information about an attribute corresponding to the tag content, including a tag granularity, and the like, where the tag granularity indicates a size of memory space occupied by the tag.

The operation information includes at least one of an operation code and a memory access granularity. The operation code indicates an operation that is performed on the memory access data corresponding to the memory address for memory access, and the operation includes a read operation or a write operation; the memory access granularity indicates a size of the memory access data.

202. Perform, according to at least one of the tag information of the memory access data, a memory address of the memory access data, and the operation information of the memory access data, an operation on the tag of the memory access data and/or the memory access data that are stored in a memory module.

The buffer scheduler may determine, according to at least one of the tag information of the memory access data, the memory address of the memory access data, and the operation information of the memory access data, to perform an operation on the tag of the memory access data, the memory access data, or the tag of the memory access data and the memory access data, where the tag of the memory access data and the memory access data are stored in the memory module.

When it is determined that an operation needs to be performed on the memory access data, if the operation information includes information that instructs the buffer scheduler to perform a read operation on the memory access data, the buffer scheduler reads the memory access data from the memory module. If the operation information includes information that instructs the buffer scheduler to perform a write operation on the memory access data, the buffer scheduler writes data carried in the operation information into the memory module.

This embodiment of the present invention provides a memory access method, and the method includes: receiving an operation request message for memory access data, where the operation request message includes tag information of the memory access data, operation information of the memory access data, and memory address information of the memory access data, where the tag information of the memory access data includes a tag type, and the tag type is used to instruct a buffer scheduler to perform an operation on the memory access data and/or a tag of the memory access data; and performing, according to at least one of the tag information of the memory access data, a memory address of the memory access data, and the operation information of the memory access data, an operation on the tag of the memory access data and/or the memory access data stored in a memory module.

In this method, a memory access tag location mapping table that includes a mapping relationship between an address of the memory access data and an address of the tag of the memory access data is pre-stored in the buffer scheduler, so that the memory access data and the tag of the memory access data can be stored at any different positions in the memory module, and meanwhile, a tag of the memory access data with various granularities can be stored in the memory module; when a central processing unit requests, according to an application scenario, to perform an operation on the memory access data and/or the tag of the memory access data stored in the memory module, the operation request message includes the tag information of the memory access data, the operation information of the memory access data, and the memory address information of the memory access data, where the tag information includes the tag type that indicates the application scenario, so that the buffer scheduler can determine the operation that needs to be performed on the memory access data and/or the tag of the memory access data, so as to further support multiple scenarios without changing the memory module or a memory chip.

Embodiment 2

Figure 3:
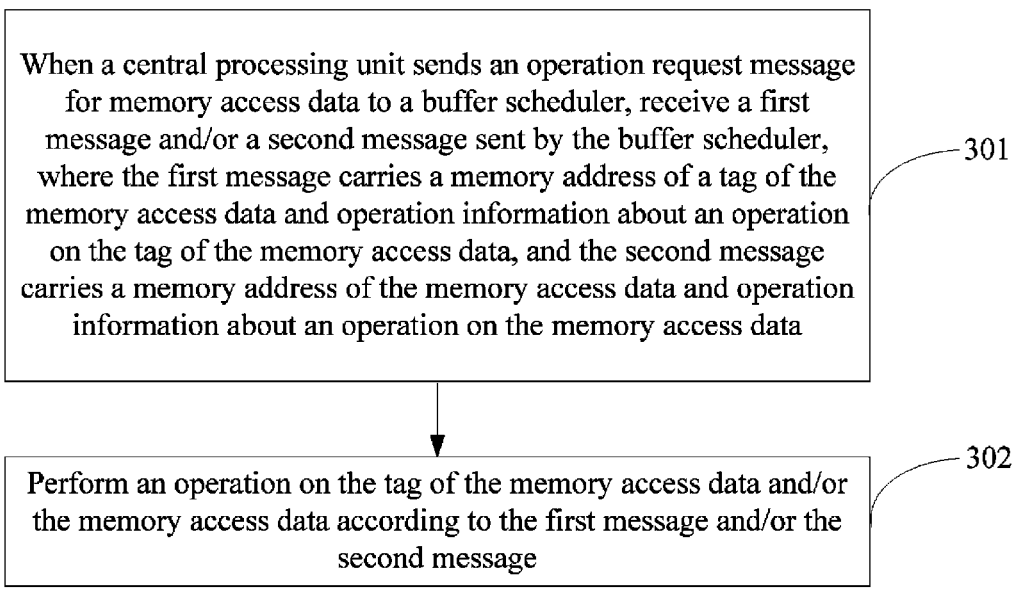
FIG. 3 is another schematic flowchart of a memory access method according to an embodiment of the present invention.

This embodiment of the present invention provides a memory access method, where an execution body of the method is a memory module, and memory access data and a tag of the memory access data are stored in the memory module, and the memory access data and the tag of the memory access data are stored in physical units of any granularities at any positions in the memory module. Certainly, the memory access data and the tag of the memory access data may be separately grouped into different areas, so that the memory access data may only be stored in a physical position corresponding to a data area of the memory module, and the tag of the memory access data may only be stored in a physical position corresponding to a tag area of the memory module. As shown in FIG. 3, the method includes:

301. When a central processing unit sends an operation request message for memory access data to a buffer scheduler, receive a first message and/or a second message sent by the buffer scheduler, where the first message carries a memory address of the tag of the memory access data and operation information about an operation on the tag of the memory access data, and the second message carries a memory address of the memory access data and operation information about an operation on the memory access data.

The memory address of the tag of the memory access data and the memory address of the memory access data are different physical addresses in the memory module.

After the central processing unit sends the operation request message for the memory access data to a memory controller, and the memory controller processes the operation request message for the memory access data into an operation request message for the memory access data with a fixed format, the memory controller sends the operation request message for the memory access data with the fixed format to the buffer scheduler.

After receiving the operation request message of the memory access data, the buffer scheduler processes the tag of the memory access data and/or the memory access data; if processing the tag of the memory access data, the buffer scheduler sends a first message to the memory module, where the first message carries the memory address of the tag of the memory access data and operation information about an operation on the tag of the memory access data; if processing the memory access data, the buffer scheduler sends a second message to the memory module, where the second message carries the memory address of the memory access data and operation information about an operation on the memory access data.

302. Perform an operation on the tag of the memory access data and/or the memory access data according to the first message and/or the second message.

Specifically, when the memory module performs an operation on the tag of the memory access data according to the first message, the memory module acquires the tag of the memory access data according to the memory address of the tag of the memory access data carried in the first message; and performs an operation on the acquired tag of the memory access data according to the operation information about an operation on the tag of the memory access data carried in the first message. The operation may be a read operation or a write operation.

Specifically, when the memory module performs an operation on the memory access data according to the second message, the memory module acquires the memory access data according to the memory address of the memory access data carried in the second message; and performs an operation on the acquired memory access data according to the operation information about an operation on the memory access data carried in the second message. The operation may specifically be a read operation or a write operation.

This embodiment of the present invention provides a memory access method, and the method includes: when a central processing unit sends an operation request message for memory access data to a buffer scheduler, receiving a first message and/or a second message sent by the buffer scheduler, where the first message carries a memory address of a tag of the memory access data and operation information about an operation on the tag of the memory access data, and the second message carries a memory address of the memory access data and operation information about an operation on the memory access data; and performing an operation on the tag of the memory access data and/or the memory access data according to the first message and/or the second message.

In this method, a memory access tag location mapping table that includes a mapping relationship between an address of the memory access data and an address of the tag of the memory access data is pre-stored in the buffer scheduler, so that the memory access data and the tag of the memory access data can be stored at any different positions in the memory module, and meanwhile, a tag of the memory access data with various granularities can be stored in the memory module; when a central processing unit requests, according to an application scenario, to perform an operation on the memory access data and/or the tag of the memory access data stored in the memory module, the operation request message includes the tag information of the memory access data, the operation information of the memory access data, and the memory address information of the memory access data, where the tag information includes the tag type that indicates the application scenario, so that the buffer scheduler can determine an operation that needs to be performed on the memory access data and/or the tag of the memory access data, so as to further support multiple scenarios without changing the memory module or a memory chip.

Embodiment 3

Figure 4:
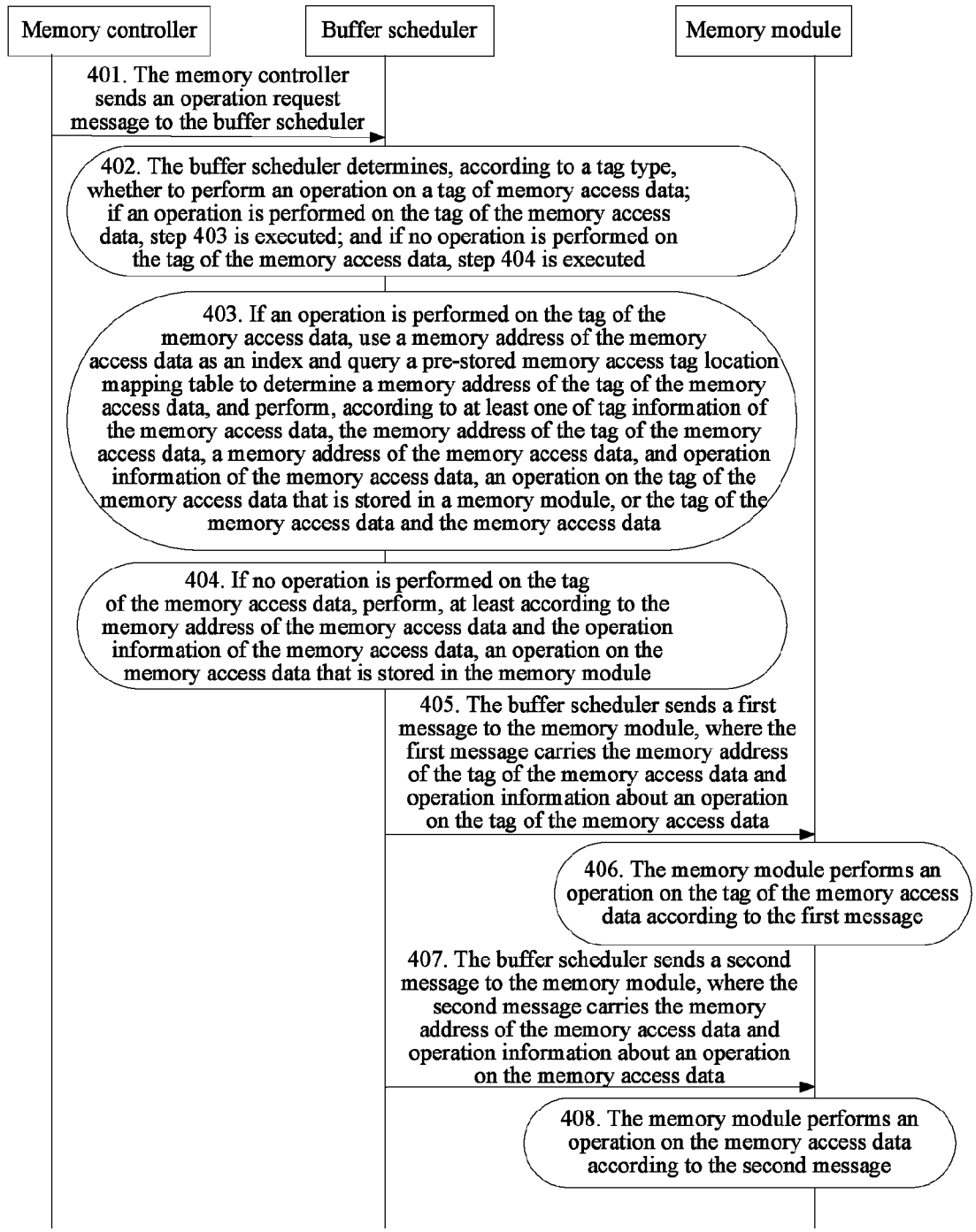
FIG. 4 is a schematic interaction diagram of a memory access method according to an embodiment of the present invention.

This embodiment of the present invention provides a memory access method. As shown in FIG. 4, the method includes:

401. A memory controller sends an operation request message to a buffer scheduler.

After a central processing unit sends the operation request message for memory access data to the memory controller, and the memory controller processes the operation request message for the memory access data into an operation request message for memory access data with a fixed format, the memory controller sends the operation request message for the memory access data with the fixed format to the buffer scheduler.

The operation request message includes tag information of the memory access data, operation information of the memory access data, and memory address information of the memory access data.

Specifically, the buffer scheduler may receive the operation request message for the memory access data that is sent by the memory controller by using a synchronous memory bus protocol or an asynchronous interface.

The tag information of the memory access data includes a tag type, and the tag type is used to instruct the buffer scheduler to perform an operation on the memory access data and/or a tag of the memory access data.

Specifically, the tag information may include only the tag type, for example, the tag type may be synchronization, access control, a directory, a memory overflow, or the like.

Certainly, the tag information may further include tag content, or tag content and a tag feature. The tag content serves different purposes for different application scenarios. For example, when the tag type is access control, the tag content may be used to indicate a process ID for accessing data of the memory address of the memory access data; when the tag type is adding N to data of a memory, the tag content may be N, and is used to instruct to add N to the data of the memory address of the memory access data. The tag feature is used to indicate information about an attribute corresponding to the tag content, including a tag granularity, and the like, where the tag granularity indicates a size of memory space occupied by the tag.

The operation information includes at least one of an operation code and a memory access granularity. The operation code indicates an operation that is performed on the memory access data corresponding to the memory address for memory access, and the operation includes a read operation or a write operation; the memory access granularity indicates a size of the memory access data.

402. The buffer scheduler determines, according to the tag type, whether to perform an operation on the tag of the memory access data.

Different application scenarios correspond to different tag types, and therefore an application scenario can be determined according to the tag type, and it is further determined whether an operation needs to be performed on the tag of the memory access data.

For example, if the tag type is 0, the application scenario is memory access control. Memory access control is an application scenario in which only a particular visitor is allowed to access particular data stored in a memory module. The particular visitor of the data is a tag of the data, and therefore the buffer scheduler needs to determine whether a visitor carried in the operation request message is the same as the specific visitor of the memory access data, and further the buffer scheduler needs to perform an operation on the tag of the memory access data.

If an operation is performed on the tag of the memory access data, step 403 is executed; if no operation is performed on the tag of the memory access data, step 404 is executed.

403. If an operation is performed on the tag of the memory access data, use the memory address of the memory access data as an index and query a pre-stored memory access tag location mapping table to determine a memory address of the tag of the memory access data, and perform, according to at least one of the tag information of the memory access data, the memory address of the tag of the memory access data, the memory address of the memory access data, and the operation information of the memory access data, an operation on the tag of the memory access data that is stored in the memory module, or the tag of the memory access data and the memory access data.

Specifically, the tag information of the memory access data specifically includes the tag type and the tag content.

The memory access tag location mapping table is pre-stored in the buffer scheduler, where the memory access tag location mapping table includes a mapping relationship between the memory address of the memory access data and the memory address of the tag of the memory access data.

In the prior art, the memory access data and the tag of the memory access data are stored in a same physical unit of the memory module, and after acquiring the address of the memory access data, the buffer scheduler may acquire the memory access data and the tag of the memory access data. In the present invention, the memory access data and the tag of the memory access data are stored in physical units with any granularities at any positions in the memory module, and therefore the memory access tag location mapping table that includes the mapping relationship between an address of the memory access data and an address of the tag of the memory access data is stored in the buffer scheduler.

When the buffer scheduler uses the memory address of the memory access data as an index and queries the pre-stored memory access tag location mapping table to determine the memory address of the tag of the memory access data, the buffer scheduler may specifically: determine whether the mapping relationship between the memory address of the memory access data and the memory address of the tag of the memory access data is stored in the pre-stored memory access tag location mapping table; if the mapping relationship between the memory address of the memory access data and the memory address of the tag of the memory access data is stored, acquire the memory address of the tag of the memory access data from the pre-stored memory access tag location mapping table according to the memory address of the memory access data; and if the mapping relationship is not stored, determine the tag content in the tag information of the memory access data as the tag of the memory access data, select, from the memory module, space that is greater than or equal to the tag granularity of the tag as the memory address of the tag of the memory access data, write the tag into the memory address, and store the mapping relationship between the memory address of the memory access data and the memory address of the tag of the memory access data into the pre-stored memory access tag location mapping table.

When the buffer scheduler determines whether the mapping relationship between the memory address of the memory access data and the memory address of the tag of the memory access data is stored in the pre-stored memory access tag location mapping table, the buffer scheduler may query whether the memory address of the memory access data exists in the memory access tag location mapping table, so as to further determine whether the memory address of the tag of the memory access data is stored in the memory access tag location mapping table.

Optionally, to enable the buffer scheduler to quickly determine, after receiving the operation request message of the memory access data, whether the mapping relationship between the memory address of the memory access data and the memory address of the tag of the memory access data is stored in the memory access tag location mapping table, corresponding information between the memory address of the memory access data stored in the memory access tag location mapping table and the memory address of the tag of the memory access data may be sorted and stored according the tag granularity, where the corresponding information is stored in the buffer scheduler.

For example, corresponding information between memory access data whose tag granularity of the tag is 4 and the memory address of the tag of the memory access data is stored as a table, and corresponding information between memory access data whose tag granularity of the tag is 8 and the memory address of the tag of the memory access data is stored as a table. In this way, when determining, according to the memory access tag location mapping table and the memory address of the memory access data, whether the memory access data has a corresponding tag, the buffer scheduler may query whether the memory address of the memory access data exists in a stored and corresponding tag granularity table according to a tag granularity in the tag information of the memory access data, and determine whether the memory address of the tag of the memory access data is stored in the memory access tag location mapping table.

When the buffer scheduler performs an operation on the tag of the memory access data, the buffer scheduler acquires, according to the memory address of the tag of the memory access data, the tag of the memory access data that is stored in the memory module; and determines, according to the tag information of the memory access data and the tag of the memory access data that is stored in the memory module, to perform an operation on the tag of the memory access data that is stored in the memory module.

Specifically, the buffer scheduler acquires, according to the memory address of the tag of the memory access data, the tag of the memory access data that is stored in the memory module; determines, according to the tag type in the tag information of the memory access data, to perform an operation on the tag of the memory access data; and performs, according to the determined operation and the tag of the memory access data that is stored in the memory module, an operation on the tag of the memory access data that is stored in the memory module.

Different tag types correspond to different operations; for example, when a tag type represents memory access control, a corresponding operation is a comparison operation. When the tag type represents that synchronization or an atomic operation is required for the memory access data, a corresponding operation is an addition and subtraction arithmetic operation.

For example, when a memory access type is an synchronization operation, the corresponding operation is an addition and subtraction arithmetic operation. The buffer scheduler performs an operation of addition and subtraction on the tag of the memory access data that is stored in the memory module, so that when the memory access data is accessed by a thread, the memory access data cannot be accessed by another thread. For example, when the tag is 0, it indicates that the memory access data can be accessed; when the tag is 1, it indicates that the memory access data cannot be accessed. When a thread accesses the memory access data, firstly, the buffer scheduler acquires, according to the memory address of the tag of the memory access data, the tag of the memory access data that is stored in the memory module; when the tag of the memory access data is 0, the thread accesses the memory access data, and meanwhile, the thread adds 1 to the tag, so that another thread cannot access the memory access data; and then, the buffer scheduler performs, according to the memory address of the memory access data and the operation information of the memory access data, an operation on the memory access data that is stored in the memory module, and after the thread accesses the data, the thread subtracts 1 from the tag, so that another thread can access the memory access data; when the tag corresponding to the memory access data is 1, the thread cannot access the memory access data, and the buffer scheduler returns a message indicating access failure to the memory controller.

Further, when the buffer scheduler performs an operation on the memory access data and the tag of the memory access data, to ensure security of data in the memory module, and after the buffer scheduler performs, according to the tag information of the memory access data and the memory address of the tag of the memory access data, an operation on the tag of the memory access data that is stored in the memory module, the method further includes: acquiring result information indicating that an operation is performed on the tag of the memory access data; determining, according to the result information, whether to perform an operation on the memory access data that is stored in the memory module; when the result information indicates that the operation performed on the tag of the memory access data is successful, performing, according to the operation information of the memory access data, an operation on the memory access data that is stored in the memory module; and when the result information indicates that the operation performed on the tag of the memory access data fails, returning a message indicating access failure to the memory controller.

For example, when the memory access type is access control, the corresponding operation is a comparison operation. The buffer scheduler acquires, according to the memory address of the tag of the memory access data, the tag of the memory access data that is stored in the memory module; the buffer scheduler compares tag content in the received tag information of the memory access data with the tag of the memory access data, so as to determine whether two of them are the same. If the tag content is the same as the tag, the result information about the result of operating on the tag information is a message indicating tag operation success, and an operation is performed, according to the memory address of the memory access data and the operation information of the memory access data, on the memory access data that is stored in the memory module; if the tag content is different from the tag, the result information about the result of operating on the tag information is a message indicating tag operation failure, and the buffer scheduler returns a message indicating access failure to the memory controller.

404. If no operation is performed on the tag of the memory access data, perform, at least according to the memory address of the memory access data and the operation information of the memory access data, an operation on the memory access data that is stored in the memory module.

It may be understood that when an operation is performed on the memory access data that is stored in the memory module, at least the memory address of the memory access data and the operation information of the memory access data are required.

Specifically, when the operation information includes information that instructs the buffer scheduler to perform a read operation on the memory access data, the buffer scheduler reads the memory access data from the memory module. When the operation information includes information that instructs the buffer scheduler to perform a write operation on the memory access data, the buffer scheduler writes data carried in the operation information into the memory module.

If the buffer scheduler performs an operation on the memory access data, steps 407-408 are executed; if the buffer scheduler performs an operation on the tag of the memory access data, steps 405-406 are executed; if the buffer scheduler performs an operation on the memory access data and the tag of the memory access data, steps 405-408 are executed.

405. The buffer scheduler sends the first message to the memory module, where the first message carries the memory address of the tag of the memory access data and the operation information about an operation on the tag of the memory access data.

406. The memory module performs an operation on the tag of the memory access data according to the first message.

Specifically, the memory module acquires the tag of the memory access data according to the memory address of the tag of the memory access data carried in the first message; and performs an operation on the acquired tag of the memory access data according to the operation information about an operation on the tag of the memory access data carried in the first message.

407. The buffer scheduler sends the second message to the memory module, where the second message carries the memory address of the memory access data and the operation information about an operation on the memory access data.

408. The memory module performs an operation on the memory access data according to the second message.

Specifically, the memory module acquires the memory access data according to the memory address of the memory access data carried in the second message; and performs an operation on the acquired memory access data according to the operation information about an operation on the memory access data carried in the second message.

What a person skilled in the art of the present invention understands is that after performing an operation on the tag of the memory access data and/or the memory access data according to the first message and/or the second message, the memory module returns an operation result to the buffer scheduler. A specific implementation process is not limited in this embodiment of the present invention.

This embodiment of the present invention provides a memory access method, and the method includes: receiving an operation request message for memory access data, where the operation request message includes tag information of the memory access data, operation information of the memory access data, and memory address information of the memory access data, where the tag information of the memory access data includes a tag type, and the tag type is used to instruct the buffer scheduler to perform an operation on the memory access data and/or a tag of the memory access data; and performing, according to at least one of the tag information of the memory access data, a memory address of the memory access data, and the operation information of the memory access data, an operation on the tag of the memory access data and/or the memory access data stored in a memory module.

In this method, a memory access tag location mapping table that includes a mapping relationship between an address of the memory access data and an address of the tag of the memory access data is pre-stored in the buffer scheduler, so that the memory access data and the tag of the memory access data can be stored at any different positions in the memory module, and meanwhile, a tag of the memory access data with various granularities can be stored in the memory module; when a central processing unit requests, according to an application scenario, to perform an operation on the memory access data and/or the tag of the memory access data stored in the memory module, the operation request message includes the tag information of the memory access data, the operation information of the memory access data, and the memory address information of the memory access data, where the tag information includes the tag type that indicates the application scenario, so that the buffer scheduler can determine an operation that needs to be performed on the memory access data and/or the tag of the memory access data, so as to further support multiple scenarios without changing the memory module or a memory chip.

Embodiment 4

Figure 5:
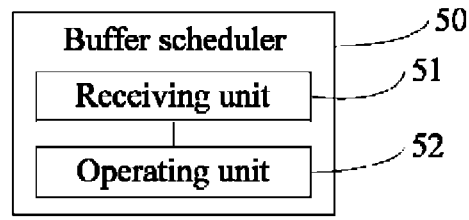
FIG. 5 is a schematic structural diagram of a buffer scheduler according to an embodiment of the present invention.

This embodiment of the present invention provides a buffer scheduler. As shown in FIG. 5, the buffer scheduler 50 includes a receiving unit 51 and an operating unit 52.

The receiving unit 51 is configured to receive an operation request message for memory access data, where the operation request message includes tag information of the memory access data, operation information of the memory access data, and memory address information of the memory access data, where the tag information of the memory access data includes a tag type, and the tag type is used to instruct to perform an operation on the memory access data and/or a tag of the memory access data.

The operating unit 52 is configured to perform, according to at least one of the tag information of the memory access data, a memory address of the memory access data, and the operation information of the memory access data, an operation on the tag of the memory access data and/or the memory access data that are stored in a memory module.

Further, the operating unit 52 is specifically configured to:

determine, according to the tag type, whether to perform an operation on the tag of the memory access data;

if an operation is performed on the tag of the memory access data, use the memory address of the memory access data as an index and query a pre-stored memory access tag location mapping table to determine a memory address of the tag of the memory access data, and perform, according to at least one of the tag information of the memory access data, the memory address of the tag of the memory access data, the memory address of the memory access data, and the operation information of the memory access data, an operation on the tag of the memory access data that is stored in the memory module, or the tag of the memory access data and the memory access data; and if no operation is performed on the tag of the memory access data, perform, according to the memory address of the memory access data and the operation information of the memory access data, an operation on the memory access data that is stored in the memory module.

Further, when the tag of the memory access data specifically includes the tag type and tag content, the operating unit 52 is specifically configured to:

determine whether a mapping relationship between the memory address of the memory access data and the memory address of the tag of the memory access data is stored in the pre-stored memory access tag location mapping table;

if the mapping relationship between the memory address of the memory access data and the memory address of the tag of the memory access data is stored, acquire the memory address of the tag of the memory access data from the pre-stored memory access tag location mapping table according to the memory address of the memory access data; and if the mapping relationship is not stored, determine the tag content in the tag information of the memory access data as the tag of the memory access data, select, from the memory module, space that is greater than or equal to a tag granularity of the tag as the memory address of the tag of the memory access data, write the tag into the memory address, and store the mapping relationship between the memory address of the memory access data and the memory address of the tag of the memory access data into the pre-stored memory access tag location mapping table.

According to the buffer scheduler provided in this embodiment of the present invention, the receiving unit receives an operation request message for memory access data, where the operation request message includes tag information of the memory access data, operation information of the memory access data, and memory address information of the memory access data, where the tag information of the memory access data includes a tag type, and the tag type is used to instruct to perform an operation on the memory access data and/or a tag of the memory access data; and the operating unit performs, according to at least one of the tag information of the memory access data, a memory address of the memory access data, and the operation information of the memory access data, an operation on the tag of the memory access data and/or the memory access data stored in the memory module.

In this method, a memory access tag location mapping table that includes a mapping relationship between an address of the memory access data and an address of the tag of the memory access data is pre-stored in the buffer scheduler, so that the memory access data and the tag of the memory access data can be stored at any different positions in the memory module, and meanwhile, a tag of the memory access data with various granularities can be stored in the memory module; when a central processing unit requests, according to an application scenario, to perform an operation on the memory access data and/or the tag of the memory access data stored in the memory module, the operation request message includes the tag information of the memory access data, the operation information of the memory access data, and the memory address information of the memory access data, where the tag information includes the tag type that indicates the application scenario, so that the buffer scheduler can determine an operation that needs to be performed on the memory access data and/or the tag of the memory access data, so as to further support multiple scenarios without changing the memory module or a memory chip.

Embodiment 5

Figure 6:
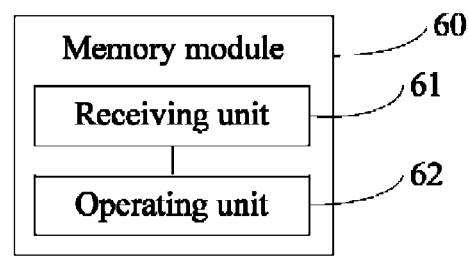
FIG. 6 is a schematic structural diagram of a memory module according to an embodiment of the present invention.

This embodiment of the present invention provides a memory module. As shown in FIG. 6, the memory module 60 includes: a receiving unit 61 and an operating unit 62.

The receiving unit 61 is configured to: when a central processing unit sends an operation request message for memory access data to a buffer scheduler, receive a first message and/or a second message sent by the buffer scheduler.

The first message carries a memory address of a tag of the memory access data and operation information about an operation on the tag of the memory access data, and the second message carries a memory address of the memory access data and operation information about an operation on the memory access data.

The operating unit 62 is configured to perform an operation on the tag of the memory access data and/or the memory access data according to the first message and/or the second message.

Further, the memory address of the tag of the memory access data and the memory address of the memory access data are different physical addresses in the memory module.

Further, the operating unit 62 is specifically configured to:

acquire the tag of the memory access data according to the memory address of the tag of the memory access data carried in the first message; and perform an operation on the acquired tag of the memory access data according to the operation information about an operation on the tag of the memory access data carried in the first message.

The operating unit is further specifically configured to:

acquire the memory access data according to the memory address of the memory access data carried in the second message; and perform an operation on the acquired memory access data according to the operation information about an operation on the memory access data carried in the second message.

According to the memory module provided in this embodiment of the present invention, when a central processing unit sends an operation request message for memory access data to a buffer scheduler, the receiving unit receives a first message and/or a second message sent by the buffer scheduler, where the first message carries a memory address of a tag of the memory access data and operation information about an operation on the tag of the memory access data, and the second message carries a memory address of the memory access data and operation information about an operation on the memory access data; and the operating unit performs an operation on the tag of the memory access data and/or the memory access data according to the first message and/or the second message.

In this method, a memory access tag location mapping table that includes a mapping relationship between an address of the memory access data and an address of the tag of the memory access data is pre-stored in the buffer scheduler, so that the memory access data and the tag of the memory access data can be stored at any different positions in the memory module, and meanwhile, a tag of the memory access data with various granularities can be stored in the memory module; when a central processing unit requests, according to an application scenario, to perform an operation on the memory access data and/or the tag of the memory access data stored in the memory module, the operation request message includes the tag information of the memory access data, the operation information of the memory access data, and the memory address information of the memory access data, where the tag information includes the tag type that indicates the application scenario, so that the buffer scheduler can determine an operation that needs to be performed on the memory access data and/or the tag of the memory access data, so as to further support multiple scenarios without changing the memory module or a memory chip.

Embodiment 6

Figure 7:
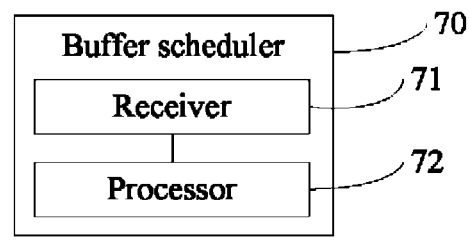
FIG. 7 is another schematic structural diagram of a buffer scheduler according to an embodiment of the present invention.

This embodiment of the present invention provides a buffer scheduler. As shown in FIG. 7, the buffer scheduler 70 includes: a receiver 71 and a processor 72.

The receiver 71 is configured to receive an operation request message for memory access data, where the operation request message includes tag information of the memory access data, operation information of the memory access data, and memory address information of the memory access data, where the tag information of the memory access data includes a tag type, and the tag type is used to instruct to perform an operation on the memory access data and/or a tag of the memory access data.

The processor 72 is configured to perform, according to at least one of the tag information of the memory access data, a memory address of the memory access data, and the operation information of the memory access data, an operation on the tag of the memory access data and/or the memory access data that are stored in a memory module.

Further, the processor 72 is specifically configured to:

determine, according to the tag type, whether to perform an operation on the tag of the memory access data;

if an operation is performed on the tag of the memory access data, use the memory address of the memory access data as an index and query a pre-stored memory access tag location mapping table to determine a memory address of the tag of the memory access data, and perform, according to at least one of the tag information of the memory access data, the memory address of the tag of the memory access data, the memory address of the memory access data, and the operation information of the memory access data, an operation on the tag of the memory access data that is stored in the memory module, or the tag of the memory access data and the memory access data; and if no operation is performed on the tag of the memory access data, perform, according to the memory address of the memory access data and the operation information of the memory access data, an operation on the memory access data that is stored in the memory module.

Further, when the tag of the memory access data specifically includes the tag type and tag content, the processor 72 is specifically configured to:

determine whether a mapping relationship between the memory address of the memory access data and the memory address of the tag of the memory access data is stored in the pre-stored memory access tag location mapping table;

if the mapping relationship between the memory address of the memory access data and the memory address of the tag of the memory access data is stored, acquire the memory address of the tag of the memory access data from the pre-stored memory access tag location mapping table according to the memory address of the memory access data; and if the mapping relationship is not stored, determine the tag content in the tag information of the memory access data as the tag of the memory access data, select, from the memory module, space that is greater than or equal to a tag granularity of the tag as the memory address of the tag of the memory access data, write the tag into the memory address, and store the mapping relationship between the memory address of the memory access data and the memory address of the tag of the memory access data into the pre-stored memory access tag location mapping table.

According to the buffer scheduler provided in this embodiment of the present invention, the receiver receives an operation request message for memory access data, where the operation request message includes tag information of the memory access data, operation information of the memory access data, and memory address information of the memory access data, where the tag information of the memory access data includes a tag type, and the tag type is used to instruct to perform an operation on the memory access data and/or a tag of the memory access data; and the processor performs, according to at least one of the tag information of the memory access data, a memory address of the memory access data, and the operation information of the memory access data, an operation on the tag of the memory access data and/or the memory access data stored in a memory module.

In this method, a memory access tag location mapping table that includes a mapping relationship between an address of the memory access data and an address of the tag of the memory access data is pre-stored in the buffer scheduler, so that the memory access data and the tag of the memory access data can be stored at any different positions in the memory module, and meanwhile, a tag of the memory access data with various granularities can be stored in the memory module; when a central processing unit requests, according to an application scenario, to perform an operation on the memory access data and/or the tag of the memory access data stored in the memory module, the operation request message includes the tag information of the memory access data, the operation information of the memory access data, and the memory address information of the memory access data, where the tag information includes the tag type that indicates the application scenario, so that the buffer scheduler can determine an operation that needs to be performed on the memory access data and/or the tag of the memory access data, so as to further support multiple scenarios without changing the memory module or a memory chip.

Embodiment 7

Figure 8:
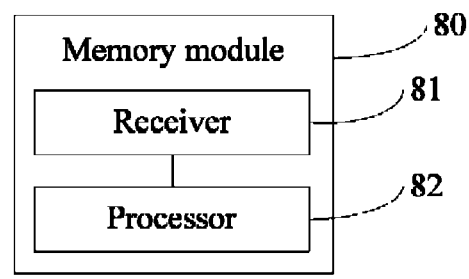
FIG. 8 is another schematic structural diagram of a memory module according to an embodiment of the present invention.

This embodiment of the present invention provides a memory module. As shown in FIG. 8, the memory module 80 includes: a receiver 81 and a processor 82.

The receiver 81 is configured to: when a central processing unit sends an operation request message for memory access data to a buffer scheduler, receive a first message and/or a second message sent by the buffer scheduler.

The first message carries a memory address of a tag of the memory access data and operation information about an operation on the tag of the memory access data, and the second message carries a memory address of the memory access data and operation information about an operation on the memory access data.

The processor 82 is configured to perform an operation on the tag of the memory access data and/or the memory access data according to the first message and/or the second message.

Further, the memory address of the tag of the memory access data and the memory address of the memory access data are different physical addresses in the memory module.

Further, the processor 82 is specifically configured to:

acquire the tag of the memory access data according to the memory address of the tag of the memory access data carried in the first message; and perform an operation on the acquired tag of the memory access data according to the operation information about an operation on the tag of the memory access data carried in the first message.

The operating unit is further specifically configured to:

acquire the memory access data according to the memory address of the memory access data carried in the second message; and perform an operation on the acquired memory access data according to the operation information about an operation on the memory access data carried in the second message.

According to the memory module provided in this embodiment of the present invention, when a central processing unit sends an operation request message for memory access data to a buffer scheduler, the receiver receives a first message and/or a second message sent by the buffer scheduler, where the first message carries a memory address of a tag of the memory access data and operation information about an operation on the tag of the memory access data, and the second message carries a memory address of the memory access data and operation information about an operation on the memory access data; and the processor performs an operation on the tag of the memory access data and/or the memory access data according to the first message and/or the second message.

In this method, a memory access tag location mapping table that includes a mapping relationship between an address of the memory access data and an address of the tag of the memory access data is pre-stored in the buffer scheduler, so that the memory access data and the tag of the memory access data can be stored at any different positions in the memory module, and meanwhile, a tag of the memory access data with various granularities can be stored in the memory module; when a central processing unit requests, according to an application scenario, to perform an operation on the memory access data and/or the tag of the memory access data stored in the memory module, the operation request message includes the tag information of the memory access data, the operation information of the memory access data, and the memory address information of the memory access data, where the tag information includes the tag type that indicates the application scenario, so that the buffer scheduler can determine an operation that needs to be performed on the memory access data and/or the tag of the memory access data, so as to further support multiple scenarios without changing the memory module or a memory chip.

It may be clearly understood by a person skilled in the art that, for the purpose of convenient and brief description, only the division of the foregoing functional modules is described by using an example, and in an actual application, the foregoing functions may be accomplished by different functional modules according to a requirement, that is, the inner structure of the apparatus is divided into different functional modules to accomplish all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely a logical function division and may be other divisions in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, a network device, or the like) or a processor (processor) to perform all or a part of the steps of the methods described in the embodiments of the present invention. The storage medium includes: any medium that can store program code, such as a USB flash disk, a removable hard disk, a read-only memory (Read-Only Memory, ROM), a random access memory (Random Access Memory, RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A memory access method, comprising:
  receiving an operation request message for memory access data, wherein the operation request message includes tag information of the memory access data, operation information of the memory access data, and a memory address of the memory access data, wherein the tag information of the memory access data comprises a tag type, and wherein the tag type instructs a buffer scheduler to perform an operation on at least one of the memory access data and a tag of the memory access data; and
  performing, according to at least one of the tag information of the memory access data, the memory address of the memory access data, and the operation information of the memory access data, the operation on the at least one of the tag of the memory access data and the memory access data that are stored in a memory module;
  wherein the performing the operation on the at least one of the tag of the memory access data and the memory access data comprises determining, according to the tag type, whether to perform an operation on the tag of the memory access data, and performing the operation on at least one of the tag of the memory access data.

2. The method according to claim 1, wherein the performing, according to at least one of the tag information of the memory access data, the memory address of the memory access data, and the operation information of the memory access data, an operation on at least one of the tag of the memory access data and the memory access data that are stored in a memory module comprises:
  using, in response to the determining to perform the operation on the tag of the memory access data, the memory address of the memory access data as an index and querying a pre-stored memory access tag location mapping table to determine a memory address of the tag of the memory access data, and performing, according to at least one of the tag information of the memory access data, the memory address of the tag of the memory access data, the memory address of the memory access data, and the operation information of the memory access data, the operation on at least one of the tag of the memory access data or both the tag of the memory access data and the memory access data; and
  performing, in response to determining to not perform the operation on the tag of the memory access data, and according to at least the memory address of the memory access data and the operation information of the memory access data, the operation on the memory access data that is stored in the memory module.

3. The method according to claim 2, wherein the tag information of the memory access data includes the tag type and tag content; and
  wherein the using the memory address of the memory access data as the index and the querying the pre-stored memory access tag location mapping table to determine the memory address of the tag of the memory access data comprises:
    determining whether a mapping relationship between the memory address of the memory access data and the memory address of the tag of the memory access data is stored in the pre-stored memory access tag location mapping table;
    acquiring, in response to determine that the mapping relationship between the memory address of the memory access data and the memory address of the tag of the memory access data is stored in the pre-stored memory access tag location mapping table, the memory address of the tag of the memory access data from the pre-stored memory access tag location mapping table according to the memory address of the memory access data; and
    determining, in response to determine that the mapping relationship between the memory address of the memory access data and the memory address of the tag of the memory access data is not stored in the pre-stored memory access tag location mapping table, the tag content in the tag information of the memory access data as the tag of the memory access data, selecting, from the memory module, space that is greater than or equal to a tag granularity of the tag as the memory address of the tag of the memory access data, writing the tag into the memory address, and storing the mapping relationship between the memory address of the memory access data and the memory address of the tag of the memory access data into the pre-stored memory access tag location mapping table.

4. A memory access method, comprising:
  receiving at least one of a first message and a second message sent by a buffer scheduler in response to a central processing unit sending an operation request message for memory access data to a buffer scheduler, wherein the first message carries a memory address of a tag of the memory access data and operation information about an operation on the tag of the memory access data, and wherein the second message carries a memory address of the memory access data and operation information about an operation on the memory access data; and performing the operation on at least one of the tag of the memory access data and the memory access data according to at least one of the first message and the second message;

wherein performing the operation on at least one of the tag of the memory access data and the memory access data comprises:

acquiring the tag of the memory access data according to the memory address of the tag of the memory access data carried in the first message; and performing the operation on the acquired tag of the memory access data according to the operation information about the operation on the tag of the memory access data carried in the first message.

5. The method according to claim 4, wherein the memory address of the tag of the memory access data and the memory address of the memory access data are different physical addresses in a memory module.

6. The method according to claim 4, wherein the performing the operation on the memory access data according to the second message comprises:

acquiring the memory access data according to the memory address of the memory access data carried in the second message; and performing the operation on the acquired memory access data according to the operation information about the operation on the memory access data carried in the second message.

7. A buffer scheduler, comprising a receiver configured to receive an operation request message for memory access data, where the operation request message includes tag information of the memory access data, operation information of the memory access data, and a memory address of the memory access data, wherein the tag information of the memory access data includes a tag type, and wherein the tag type instructs to perform an operation on at least one of the memory access data and a tag of the memory access data;

a processor connected to the receiver;

a non-transitory computer readable medium connected to the processor and having stored thereon instructions that, when executed by the processor, cause the buffer scheduler to:

perform, according to at least one of the tag information of the memory access data, the memory address of the memory access data, and the operation information of the memory access data, the operation on at least one of the tag of the memory access data and the memory access data that are stored in a memory module, wherein the instructions that cause the buffer schedule to perform the operation on the at least one of the tag of the memory access data and the memory access data include instructions that cause the buffer scheduler to determine, according to the tag type, whether to perform an operation on the tag of the memory access data, and perform the operation on at least one of the tag of the memory access data.

8. The buffer scheduler according to claim 7, wherein the instructions causing the buffer scheduler to perform the operation comprise instructions, that when executed by the processor, cause the buffer scheduler to:

use, in response to determining to perform the operation on the tag of the memory access data, the memory address of the memory access data as an index, query a pre-stored memory access tag location mapping table to determine a memory address of the tag of the memory access data, and perform, according to at least one of the tag information of the memory access data, the memory address of the tag of the memory access data, the memory address of the memory access data, and the operation information of the memory access data, the operation on at least one of the tag of the memory access data, or both the tag of the memory access data and the memory access data; and perform, in response to the determining not to perform the operation on the tag of the memory access data and according to the memory address of the memory access data and the operation information of the memory access data, an operation on the memory access data that is stored in the memory module.

9. The buffer scheduler according to claim 8, wherein the tag information of the memory access data includes the tag type and tag content; and wherein the non-transitory computer readable medium further has stored thereon instructions that, when executed by the processor, cause the buffer scheduler to:

determine whether a mapping relationship between the memory address of the memory access data and the memory address of the tag of the memory access data is stored in the pre-stored memory access tag location mapping table;

acquire, in response to determining that the mapping relationship between the memory address of the memory access data and the memory address of the tag of the memory access data are stored in the pre-stored memory access tag location mapping table, the memory address of the tag of the memory access data from the pre-stored memory access tag location mapping table according to the memory address of the memory access data; and determine the tag content in the tag information of the memory access data as the tag of the memory access data in response to determining that the mapping relationship between the memory address of the memory access data and the memory address of the tag of the memory access data are not stored in the pre-stored memory access tag location mapping table, select, from the memory module, space that is greater than or equal to a tag granularity of the tag as the memory address of the tag of the memory access data, write the tag into the memory address, and store the mapping relationship between the memory address of the memory access data and the memory address of the tag of the memory access data into the pre-stored memory access tag location mapping table.

10. A memory module comprising a receiver configured to receive at least one of a first message and a second message sent by a buffer scheduler in response to a central processing unit sending an operation request message for memory access data to the buffer scheduler, wherein the first message carries a memory address of a tag of the memory access data and operation information about an operation on the tag of the memory access data, and wherein the second message carries a memory address of the memory access data and operation information about an operation on the memory access data; and a processor connected to the receiver;

a non-transitory computer readable medium connected to the processor and having stored thereon instructions that, when executed by the processor, cause the memory module to:

perform the operation on the at least one of the tag of the memory access data and the memory access data according to the at least one of the first message and the second message;

wherein the instructions that cause the memory module to perform the operation on the at least one of the tag of the memory access data and the memory access data comprise instructions that cause the memory module to:

acquire the tag of the memory access data according to the memory address of the tag of the memory access data carried in the first message; and perform the operation on the acquired tag of the memory access data according to the operation information about the operation on the tag of the memory access data carried in the first message.

11. The memory module according to claim 10, wherein the memory address of the tag of the memory access data and the memory address of the memory access data are different physical addresses in the memory module.

12. The memory module according to claim 10, wherein the non-transitory computer readable medium further has stored thereon instructions that, when executed by the processor, cause the memory module to:

acquire the memory access data according to the memory address of the memory access data carried in the second message; and perform an operation on the acquired memory access data according to the operation information about the operation on the memory access data carried in the second message.

* * * * *